United States Patent [19]

Hawkins et al.

[11] Patent Number: 5,093,874

[45] Date of Patent: Mar. 3, 1992

[54] INTEGRATED ELECTRO-OPTICAL SCANNER WITH PHOTOCONDUCTIVE SUBSTRATE

[75] Inventors: Gilbert A. Hawkins, Mendon; Joseph F. Revelli, Rochester; David J. Williams, Fairport, all of N.Y.

[73] Assignee: Eastman Kodak Company, Rochester, N.Y.

[21] Appl. No.: 678,486

[22] Filed: Apr. 1, 1991

[51] Int. Cl.⁵ ............................................... G02B 6/10
[52] U.S. Cl. ........................................ 385/8; 385/14; 385/143
[58] Field of Search ............... 350/96.11, 96.12, 96.13, 350/96.14, 96.34; 358/901

[56] References Cited

U.S. PATENT DOCUMENTS

| | | | |
|---|---|---|---|
| 4,792,208 | 12/1988 | Ulman et al. | 350/96.34 |
| 4,844,577 | 7/1989 | Ninnis et al. | 350/96.29 |
| 4,948,225 | 8/1990 | Rider et al. | 350/96.34 |
| 4,955,977 | 9/1990 | Das et al. | 350/96.34 |
| 5,009,483 | 4/1991 | Rockwell, III | 350/96.24 |

Primary Examiner—Frank Gonzalez
Attorney, Agent, or Firm—Warren W. Kurz

[57] ABSTRACT

A fully integrated electro-optic page-scanner comprises an optically transparent waveguide made from an electro-optic polymer, and an electrode structure including a linear array of electrically-addressable, spaced, parallel electrodes for selectively altering the refractive index across pixel-sized portions of the polymeric waveguide. According to the invention, the addressable electrodes are disposed on a photoconductive substrate which facilitates poling of the polymer waveguide to render it electro-optic in nature. During the poling process, the photoconductive substrate is made electrically conductive by flood illumination, while a uniform electric field is established between the substrate and a transparent electrode which overlies the waveguide layer, opposite the addressable electrodes. Preferably, the photoconductive substrate comprises undoped silicon which enables certain electrode-addressing circuitry to be integrated within the scanner structure.

10 Claims, 3 Drawing Sheets

INTEGRATED ELECTRO-OPTICAL SCANNER WITH PHOTOCONDUCTIVE SUBSTRATE

This invention relates to improvements in electro-optic scanning devices for delivering information-modulated light to a photosensitive surface in an optical information recording apparatus, such as electrophotographic printers and copiers.

It is known to record optical information on a moving photosensitive medium by directing a sheet-like beam of collimated light through electro-optic crystal materials (e.g., lithium niobate or lithium tantalate) while modulating the phase front of the beam to form a scanning line of picture elements or "pixels" across the width of the recording medium. Such known apparatus is disclosed, for example, in U.S. Pat. Nos. 4,367,925 and 4,386,827. As disclosed in these references, the light beam enters a block of electro-optic crystal through a side face thereof, reflects off the base, and exits through the opposite side face. The base of the crystal supports a linear array of closely-spaced and parallel electrodes. Each pair of adjacent electrodes defines one pixel of information. When a voltage is applied between adjacent electrode pairs, fringing electric fields are established within the crystal. Such fields act to selectively alter the refractive index of the crystal, resulting in a phase change in that portion of the phase front of the collimated beam passing through the affected area Schlieren optics are used to convert the phasefront modulated beam into a corresponding intensity-modulated pixel pattern representing an entire line of image information. By imaging such pattern onto a moving photosensitive recording element while periodically addressing, in parallel, all electrode pairs in the array with line information, a two-dimensional image is produced. Typically, the electrodes and their spacings measure from 1 to 30 microns in width, and it is possible to produce images having over 5,000 resolvable pixels per line.

In order for the above-mentioned electro-optic scanning apparatus to produce high quality images, it is necessary that the light-modulating fringing electric fields produced between adjacent electrode pairs deeply penetrate the crystal and be highly uniform across the entire array. Such penetration and uniformity requires a good coupling between each electrode and the underlying portion of the crystal. To achieve such coupling, special care must be taken to polish the crystal surfaces, and special devices, such as elastomeric pads, are commonly used for biasing the electrodes against the crystal. However, even with such polishing and resilient biasing structures, it is difficult to obtain the necessary uniformity in the electric fields to assure that scan-line image quality is not degraded. Other disadvantages associated with the above scanning apparatus are: (1) the relatively large electro-optic crystals required by such scanners are costly to produce and, (2) owing to the need to create relatively deeply penetrating fringing electric fields within the crystal, relatively high voltage must be applied between adjacent electrodes.

In the commonly assigned U.S. application No. 632,195 filed on Dec. 21, 1990, entitled INTEGRATED ELECTRO-OPTICAL SCANNER, in the names of J. F. Revelli and D. J. Williams, now U.S. Pat. No. 5,052,711 issued on Oct. 1, 1991 there is disclosed a scanning device of the type described above in which the uniformity of the phase-altering electric fields created within the electro-optic medium is significantly improved. In such a device, the aforementioned crystal is replaced by a thin (0.5 to 3 microns) transparent plastic film which exhibits electro-optic properties when suitably poled. The plastic film, which is supported by a relatively thick (e.g., 1–10 mm) substrate of glass or silicon, is adapted to transmit therethrough, by multiple total internal reflections, (i.e., waveguiding), a sheet-like beam of collimated light. The plastic film is supported by a glass or silicon substrate having a planar electrode thereon. A linear array of spaced parallel electrodes is disposed atop the plastic film. Each electrode in the array, together with the underlying planar electrode, defines a pixel (picture element) in a line of image information. The individual electrodes in this array are etched (by photolithographic techniques) from a planar electrode which is used, during the manufacturing process, to uniformly pole that portion of the polymeric film situated between the electrode array and the underlying planar electrode carried by the substrate. In use, an electric field is selectively provided between each of the spaced, parallel electrodes and the opposing planar electrode to produce a change in refractive index through selected portions of the interposed electro-optic polymer film. Such change in refractive index acts to modulate the phase front of collimated light passing through such selected portions in accordance with pixel image information to be recorded. Optical means are provided within the integrated waveguide structure for converting the phase-modulated wavefront of the propagating beam to an intensity-modulated pixel pattern which can be imaged upon the surface of a light-sensitive recording medium.

While the polymeric waveguide used in the above-mentioned scanner facilitates good electrical coupling between the pixel electrodes and the underlying electro-optic material, some difficulty can be encountered in making good electrical contact with each of the pixel electrodes in order to suitably address such electrodes with image information. In the device disclosed, an external driver circuit must be precisely positioned atop the pixel electrodes in order to achieve the requisite contact with each pixel electrode. This alignment requirement adds to the manufacturing cost and detracts from the ruggedness of the device.

SUMMARY OF THE INVENTION

In view of the foregoing discussion, an object of this invention is to provide an integrated electro-optic scanner in which the aforementioned alignment problems are eliminated. The integrated electro-optic scanner of the invention is characterized by a photoconductive substrate, preferably pure (i.e., undoped) silicon, on which the electrically addressable "pixel" electrodes and, preferably, the necessary addressing circuitry are fabricated. A polymeric waveguide material is disposed atop the photoconductive substrate and its electrode structure, and a transparent electrode (e.g., indium tin-oxide) is disposed atop the waveguide layer. Preferably, the opposing planar surfaces of the waveguide are physically spaced from the electrodes by polymeric buffer layers which act to minimize optical losses in an optical phasefront propagating in the waveguide. Uniform poling of that portion of the polymeric waveguide situated between the addressable electrodes and the transparent electrode is achieved by simultaneously (1) heating the polymeric waveguide to its poling temperature; (2) illuminating the photoconductive substrate through the transparent electrode and waveguide layer, to render the substrate electrically conductive; (3) applying an electric field between the substrate and transparent electrode. To prevent the pixel electrodes from shorting together through the photoconductive substrate when the device is used in ambient light, an opaque layer may be deposited atop the transparent conductive layer after poling has been effected.

The invention will be better understood from the ensuing detailed description of preferred embodiments, reference being made to the accompanying drawings.

DETAILED DESCRIPTION OF THE PREFERRED EMBODIMENTS

Figure 1:
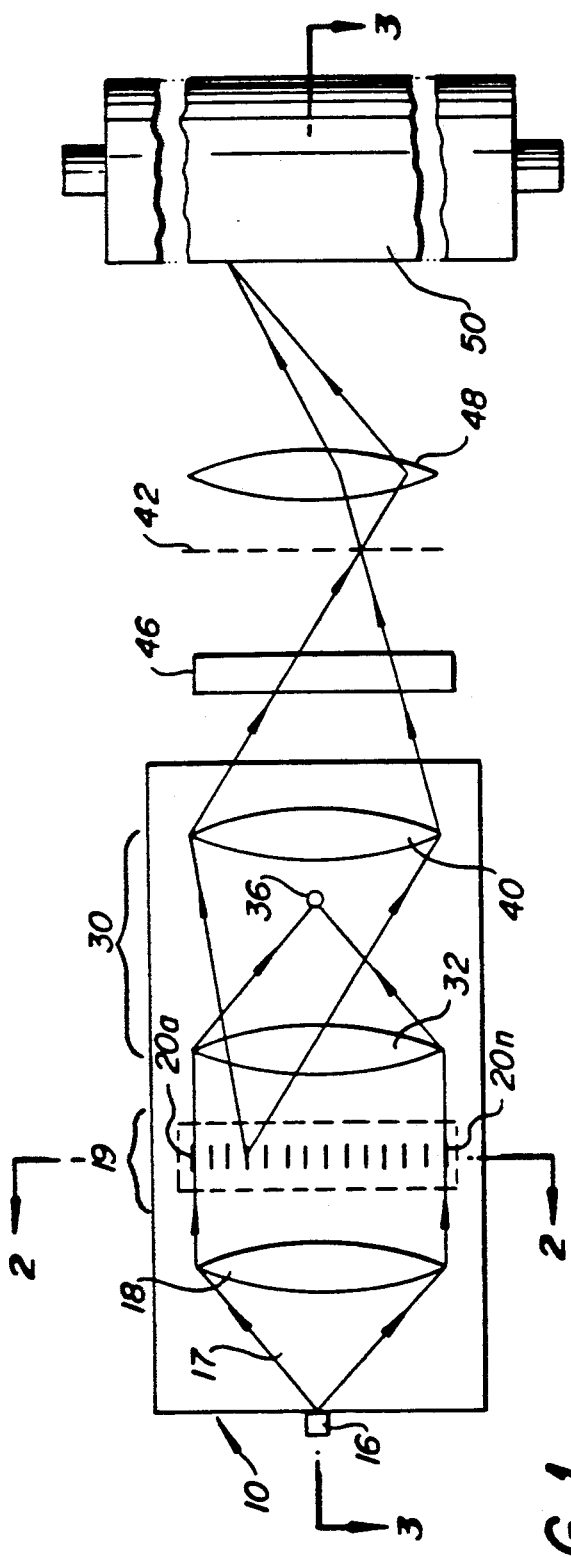
FIG. 1 is a schematic plan view of the primary optical components of a fully-integrated electro-optic scanner embodying the present invention.
Figure 2:
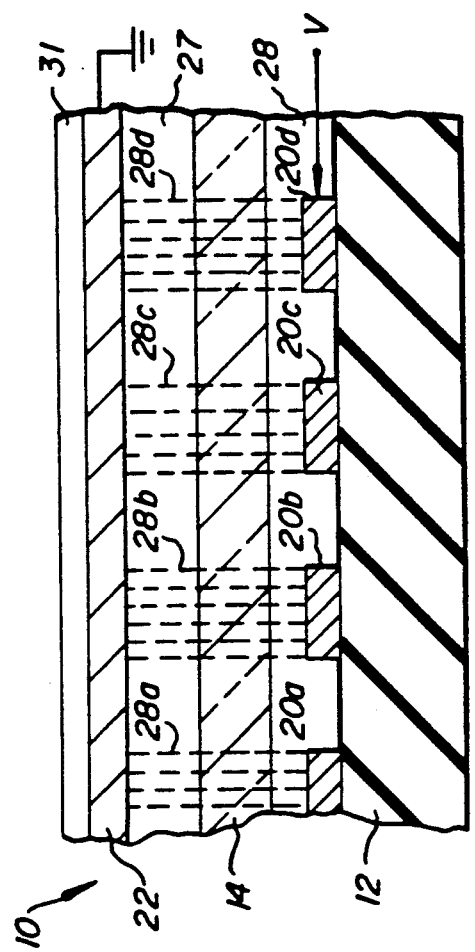
FIG. 2 is a greatly enlarged cross-section of a portion of the electrode area of the integrated device of FIG. 1, being viewed in the direction of section line 2—2 in FIG. 1.
Figure 3:
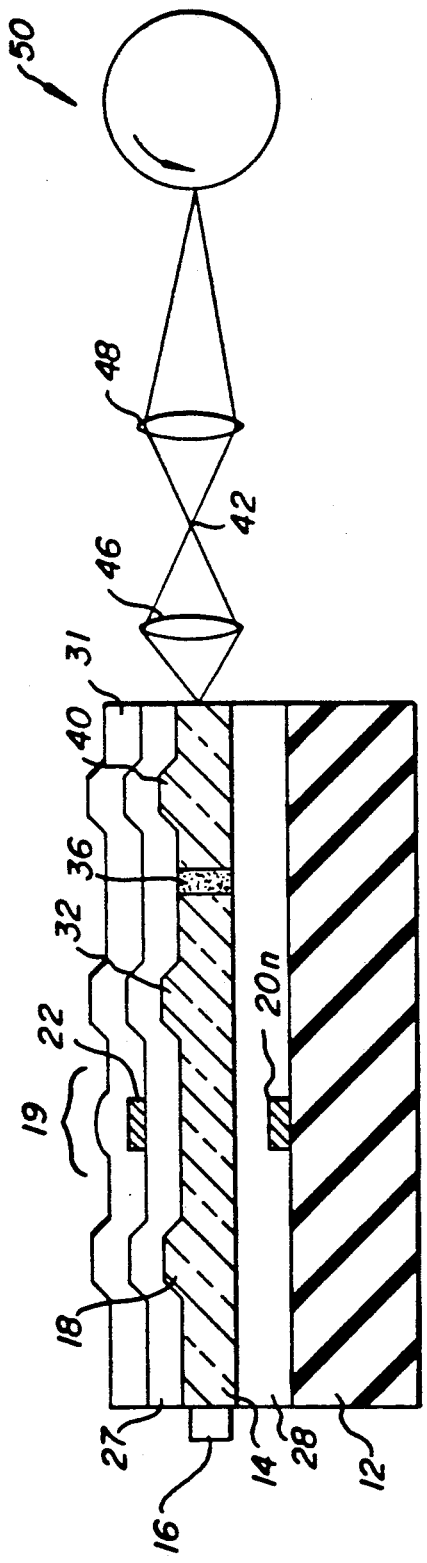
FIG. 3 is an enlarged cross-section of the FIG. 1 device taken along the section line 3—3 in FIG. 1.

With reference to FIGS. 1, 2 and 3, a fully-integrated electro-optic page-scanning device 10 comprises a photoconductive substrate 12, preferably made of pure (i.e., undoped silicon) having a thickness between 1 and 10 mm. Substrate 12 supports an optical waveguide in the form of a thin (e.g., 0.5 to 3 microns thick) film 14 of a poled, optically transparent, electro-optic polymer material. Suitable electro-optic polymers are those which exhibit a high second order polarization susceptibility, such as the polymers disclosed in the commonly-assigned U.S. Pat. No. 4,792,208 (Ulman et al) U.S. Pat. No. 4,948,225 (Rider et al) and U.S. Pat. No. 4,955,977 (Dao et al), the disclosures of which are incorporated herein by reference. A laser diode 16, butt-coupled to one edge of the polymer film, serves as a source of a sheet-like light beam 17 which is guided in the plane of the waveguide film 14 by total internal reflection. It is not necessary, of course, that the light source be in the form of laser diode 16, or that the light source be directly coupled to polymer film 14. Instead, beam 17 may be generated by a remote laser source having an output beam which is optically coupled to the film by a conventional grating or prism coupler, as shown in the above-referenced patents.

A waveguide lens 18 (e.g., a mode-index, geodesic, fresnel or Luneberg lens) collimates the sheet-like beam 17 and directs it through a beam-modulating area 19 in which the electro-optic polymer material 14 is sandwiched between a plurality of closely-spaced lower electrodes 20a, 20b, 20c, 20d–20n, each being electrically addressable with a pixel of image information and an upper planar electrode 22 which extends across all of the lower electrodes. For reasons explained below, electrode 22 is optically transparent and may comprise, for example, indium-tin oxide. Preferably, the pixel electrodes 20a–20n and the opposing planar electrode 22 have a thickness between 0.01 and 1.0 microns and are spaced from the electro-optic polymer film by buffer layers 27 and 28, respectively. The buffer layers comprise thin films (e.g., 0.5 to 5 microns thick) optically transparent dielectric materials (e.g., silicon dioxide or polymethylmethacrylate) having a refractive index which is somewhat lower than that of the polymer waveguide. The lower refractive index promotes total internal reflection of beam 17 within the waveguide and thereby prevents the absorption of light propagating within the waveguide by the electrode structure. After poling of the polymeric waveguide layer (described below), the upper buffer layer 27 and planar electrode 22 are covered with an opaque layer 31 to prevent ambient light from rendering the upper surface of the substrate conductive and thereby shorting the pixel electrodes 20a–20n together.

Figure 4B:
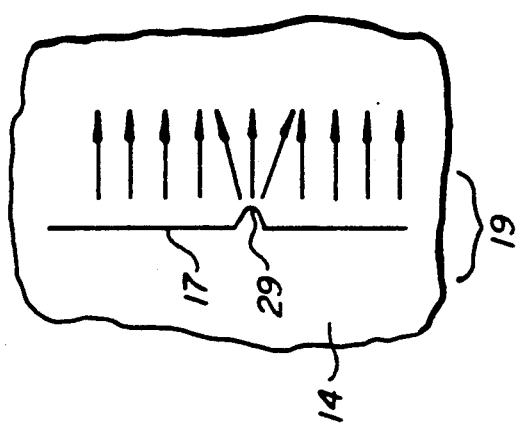
FIG. 4B is a schematic diagram similar to FIG. 4A showing a phasefront being modified by an electric field formed in the same beam-modulating area.
Figure 4A:
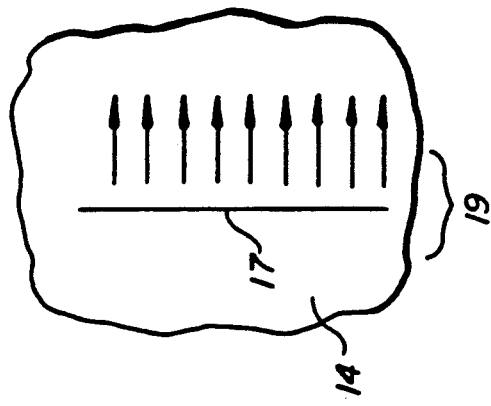
FIG. 4A is a schematic diagram showing a uniform phasefront of collimated light travelling through a portion of the beam-modulated area of the device of FIG. 1.
Figure 5:
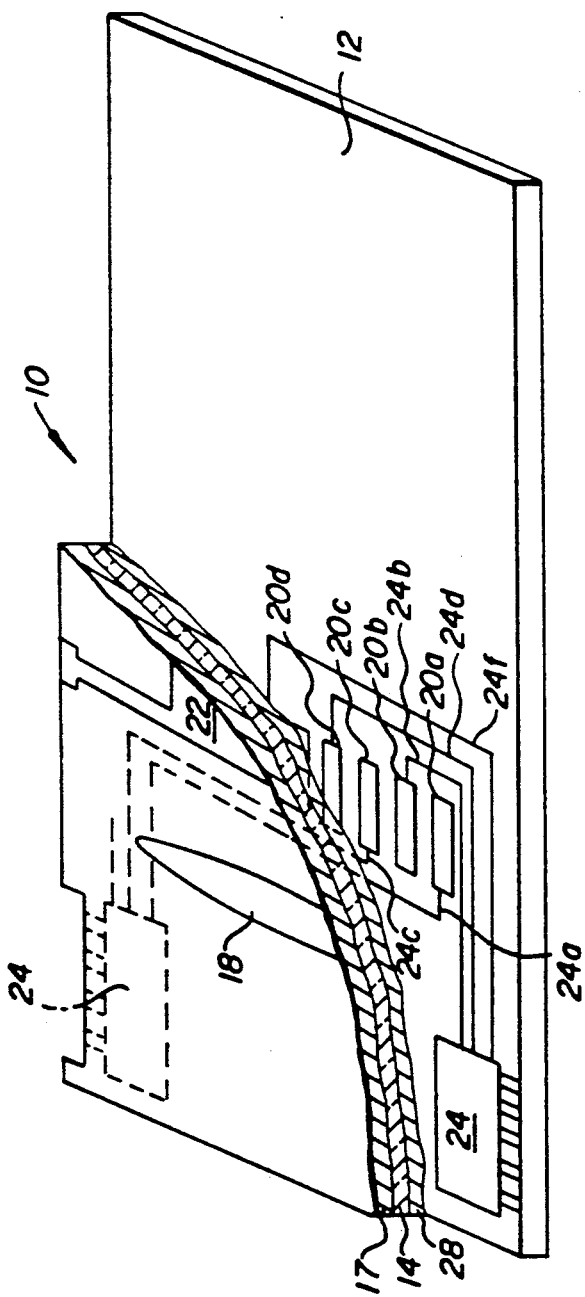
FIG. 5 is a perspective cutaway illustration of the FIG. 1 device.

Electrical addressing of the individual upper electrodes 20a–20n is achieved by well-known electronic circuitry 24 (schematically shown in FIG. 5) which by photolithographic techniques is formed on the silicon substrate. Such circuitry comprises a plurality of electrical conductors 24a–24n which make contact with the lower electrodes 20a–20n, respectively. Suitable addressing circuitry is disclosed in U.S. Pat. No. 4,386,827. When none of the pixel electrodes are addressed (i.e. no voltage is applied), the sheet of light passes through-region 19 as a plane wave, as shown in FIG. 4A. When the electronic driver circuit selectively applies a voltage to certain pixel electrodes (e.g., electrodes 20a and 20c in FIG. 2), discrete electric fields 28a–28d are produced across the thickness of the polymer film, within modulating area 19. The presence of such an electric field changes the index of refraction in the electro-optic polymer (by means of the well-known Pockels effect) resulting in perturbations in the uniform phase front of collimated light beam 17. Each perturbed portion 29 on the phase front acts as a diffracting spot which, as illustrated in FIG. 4B, behaves as a point source of light.

Referring again to FIG. 1, Schlieren optics 30, which are also integrated within the waveguide structure in the form of mode-index or Luneberg optical elements, function to convert the phase front modulated light beam into a linear, intensity-modulated pixel pattern. The Schlieren optics comprises a lens 32 which focuses all of the non-diffracted light to an opaque light-absorbing stop 36, and lens 40 which focuses the light diffracted around stop 36 at an image plane 42, outside the integrated structure. Each of the pixel regions where the phase front has been disturbed appears as an illuminated pixel at image plane 42. Cylinder lens 46 collects light exiting from the waveguide structure and focuses it to a line image at image plane 42. Spherical lens 48 projects and magnifies the image of the linear pixel pattern onto a photosensitive surface, such as the photoconductive surface of electrophotographic drum 50. As such drum rotates, electrodes 20a–20n are periodically addressed, in parallel, with line information, thereby recording a two-dimensional (page) of image information on the drum surface.

The above-described monolithic structure can be manufactured by a series of conventional thin-film deposition techniques. First, the pixel electrodes 20a–20n are formed atop the photoconductive substrate 12 by vapor or sputter depositing a strip of metallic material (e.g., aluminum) to the desired thickness (0.1 to 1 microns). The individual pixel electrodes are delineated in this conductive strip by conventional photolithography. Buffer layer 28 is then formed atop pixel electrodes 20a-20n (at least in the light-modulated region 19). The manner in which buffer layer 28 is formed depends upon the material. When the buffer layer is polymethylmethacrylate (PMMA), it can be formed by a spin-coating technique; when it is silicon dioxide, it can be reactively sputtered. The polymer waveguide layer 14 is then spin-coated on the buffer layer 28 to the desired thickness (0.5 to 3 microns). At this point, a small hole (e.g., 0.5 to 5 microns in diameter) is milled in the waveguide at the location of stop 36. A light-absorbing dye is deposited in the hole to provide the light-stopping function. Lens 18, 32 and 40 are then formed atop the waveguide, such as by the process disclosed in the commonly assigned U.S. patent application No. 377,699, filed on July 10, 1989 in the name of J. C. Brazas (now abandoned). The second buffer-layer 27 is formed atop the polymer layer, at least in region 19, in the same manner as buffer layer 28 is formed. Thereafter, the transparent conductive electrode 22 is sputter-deposited atop buffer layer 27 directly above the pixel electrodes to a thickness of from 0.01 to 5 microns. Finally, the opaque film (e.g., a light-absorbing, dye-loaded polymer) is spin coated atop layer 27 and electrode 22 to a desired thickness (e.g., 5-10 microns).

Uniform poling of the polymeric waveguide in the electroded region 19 is achieved in the following manner: First, individual spaced parallel electrodes 20a-20n are shorted together and maintained at some common potential. Second, ohmic contact is made to the photoconductive substrate. Next, a poling voltage is applied to the upper transparent planar electrode while the device is heated to its poling temperature (typically 80° to 100 degrees C.). Finally, light is shone through the transparent upper electrode and made incident on the portion of the photoconductive substrate that is not covered by the individual spaced parallel electrodes 20a-20n. In the presence of this light, the substrate surface (silicon) becomes conducting and consequently permits a uniform potential to be established in a plane parallel to the transparent upper electrode. The substrate is electrically grounded, and the potential of the connected spaced parallel electrodes is adjusted (via a bias potential), if necessary, to insure a uniform electric field throughout region 19. The device is then cooled to room temperature in the presence of both the illumination and the applied poling field. After cooling, both the illumination and the electric field are removed.

Figure 6:
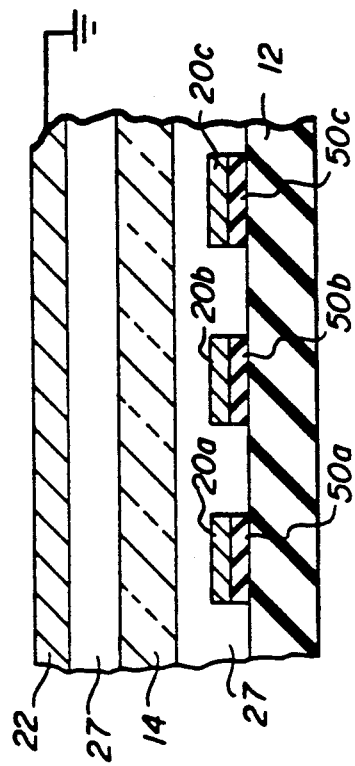
FIG. 6 is a cross-sectional illustration of an alternative embodiment

To assure electrical isolation between the pixel electrodes 20a-20n and the underlying photoconductive substrate, each such electrode may be deposited atop a dielectric layer 50a-50c, as shown in FIG. 6. Such a dielectric layer may comprise, for example, silicon dioxide which may be readily grown atop a silicon substrate and etched, by photolithographic techniques, at the same time the pixel electrodes are delineated.

Rather than using a silicon substrate which best facilitates the integration of the electrode addressing circuitry into the monolithic structure, other photoconductive substrates may be used, including selenium and any of the many organic photoconductors. In such case, these photoconductive materials can be disposed on a metal or glass support.

There are several advantages of the above-described embodiments over the previously mentioned prior art device. As noted above, the device of the invention is simpler to construct since the need to align and contact closely-spaced parallel electrodes on the external driver chip and the waveguide device is eliminated. Also, the resultant device is much more compact and more robust since the upper driver chip is no longer required (assuming the driver circuitry is integrated in the substrate). In addition, the device is less costly to construct because the fabrication process is more simple and less labor-intensive. All alignment is accomplished through the photolithography.

The invention has been described in detail with particular reference to preferred embodiments thereof, but it will be understood that variations and modifications can be effected within the spirit and scope of the invention.

What is claimed is:

1. An integrated electro-optic device for use in scanning a photosensitive medium with a focused line of light comprising a plurality of closely spaced, intensity-modulated pixels to record a two-dimensional image, said device comprising:

a photoconductive substrate;

a plurality of spaced, parallel electrodes disposed on a surface of said photoconductive substrate;

a first buffer layer disposed atop said electrodes, said first buffer layer comprising a transparent dielectric material;

an optical waveguide layer disposed on said first buffer layer, said waveguide layer comprising an optically-transparent, polymer material, said waveguide layer being adapted to transmit a uniform phasefront of light therethrough in a direction substantially perpendicular to the layer thickness by multiple total internal reflections;

a second buffer layer deposited atop said polymer layer, said second buffer layer comprising a transparent dielectric material, said first and second buffer layers having a refractive index lower than the refractive index of said polymer layer;

a transparent electrode disposed atop said second buffer layer, opposite said spaced, parallel electrodes;

said optical waveguide layer exhibiting electro-optic properties at least in the region interposed between said transparent electrode and that portion of the substrate on which said spaced, parallel electrodes are disposed, means for selectively applying an electric field between each of selected spaced, parallel electrodes and said transparent electrode to cause selected portions of said polymer layer therebetween to perturb selected portions of a uniform phasefront propagating therethrough in accordance with pixel image information to be recorded, means for converting a perturbed phasefront of light within said waveguide layer to an intensity-modulated pixel pattern; and means for projecting an image of said intensity-modulated pixel pattern upon the surface of a photosensitive medium.

2. The electro-optic device of claim 1 wherein said converting means comprises Schlieren optics.

3. The electro-optic device of claim 1 wherein said electro-optical polymer film is deposited on said first electrode layer by spin-coating.

4. The electro-optic device of claim 1 wherein said producing means comprises a laser diode operatively-coupled to said electro-optic polymer layer.

5. The electro-optic device of claim 1 wherein said photoconductive substrate comprises undoped silicon.

6. The electro-optic device of claim 5 wherein said field-applying means comprises electrical circuitry integrated into said substrate.

7. The electro-optic device of claim 1 further comprising an opaque film overlying said second buffer layer and said transparent electrode.

8. The electro-optic device of claim 1 wherein a dielectric material is disposed between each of said spaced, parallel electrodes and said substrate.

9. The electro-optic device of claim 1 wherein said photoconductive substrate comprises selenium.

10. The electro-optic device of claim 1 wherein said photoconductive substrate comprises an organic material.

* * * * *